United States Patent
Sharma et al.

(10) Patent No.: US 11,482,241 B2
(45) Date of Patent: Oct. 25, 2022

(54) CHARACTERIZING, SELECTING AND ADAPTING AUDIO AND ACOUSTIC TRAINING DATA FOR AUTOMATIC SPEECH RECOGNITION SYSTEMS

(71) Applicant: Nuance Communications, Inc., Burlington, MA (US)

(72) Inventors: Dushyant Sharma, Marlow (GB); Patrick Naylor, Reading (GB); Uwe Helmut Jost, Maidenhead (GB)

(73) Assignee: Nuance Communications, Inc, Burlington, MA (US)

( * ) Notice: Subject to any disclaimer, the term of this patent is extended or adjusted under 35 U.S.C. 154(b) by 425 days.

(21) Appl. No.: 16/089,287

(22) PCT Filed: Mar. 27, 2017

(86) PCT No.: PCT/US2017/024343
§ 371 (c)(1),
(2) Date: Sep. 27, 2018

(87) PCT Pub. No.: WO2017/172632
PCT Pub. Date: Oct. 5, 2017

(65) Prior Publication Data
US 2020/0312349 A1    Oct. 1, 2020

Related U.S. Application Data
(63) Continuation of application No. 15/082,349, filed on Mar. 28, 2016, now Pat. No. 9,922,664.

(51) Int. Cl.
*G10L 25/30* (2013.01)
*G10L 19/00* (2013.01)
(Continued)

(52) U.S. Cl.
CPC ............ *G10L 25/30* (2013.01); *G10L 15/063* (2013.01); *G10L 15/065* (2013.01); *G10L 15/20* (2013.01);
(Continued)

(58) Field of Classification Search
CPC ..... G10L 25/30; G10L 15/063; G10L 15/065; G10L 15/20; G10L 19/0018; G10L 19/06; G10L 21/003; G10L 2015/0631
(Continued)

(56) References Cited

U.S. PATENT DOCUMENTS

| 4,862,452 A | 8/1989 | Milton et al. |
| 6,073,096 A | 6/2000 | Gao |

(Continued)

FOREIGN PATENT DOCUMENTS

| CN | 1331467 A | 1/2002 |
| CN | 101288116 A | 10/2008 |

(Continued)

OTHER PUBLICATIONS

International Search Report and Written Opinon of PCT/US2017/024343 dated Oct. 19, 2017 entitled "Characterizing, Selecting and Adapting Audio and Acoustic Training Data for Automatic Speech Recognition Systems".
International Preliminary Report on Patentability for PCT/US2017/024343 dated Oct. 2, 2018 entitled "Characterizing, Selecting and Adapting Audio and Acoustic Training Data for Automatic Speech Recognition Systems".
(Continued)

*Primary Examiner* — Thierry L Pham

(57) ABSTRACT

A system for and method of characterizing a target application acoustic domain analyzes one or more speech data samples from the target application acoustic domain to determine one or more target acoustic characteristics, including a CODEC type and bit-rate associated with the speech data samples. The determined target acoustic characteristics may also include other aspects of the target speech data samples such as sampling frequency, active (Continued)

bandwidth, noise level, reverberation level, clipping level, and speaking rate. The determined target acoustic characteristics are stored in a memory as a target acoustic data profile. The data profile may be used to select and/or modify one or more out of domain speech samples based on the one or more target acoustic characteristics.

20 Claims, 8 Drawing Sheets

(51) Int. Cl.
G10L 19/06 (2013.01)
G10L 15/06 (2013.01)
G10L 15/065 (2013.01)
G10L 21/003 (2013.01)
G10L 15/20 (2006.01)

(52) U.S. Cl.
CPC .......... *G10L 19/0018* (2013.01); *G10L 19/06* (2013.01); *G10L 21/003* (2013.01); *G10L 2015/0631* (2013.01)

(58) Field of Classification Search
USPC ........................................................ 704/202
See application file for complete search history.

(56) References Cited

U.S. PATENT DOCUMENTS

| 9,922,664 B2* | 3/2018 | Sharma ................... G10L 15/20 |
| 2005/0156775 A1 | 7/2005 | Petre et al. |
| 2008/0123670 A1 | 5/2008 | Mundra et al. |
| 2011/0295603 A1 | 12/2011 | Meisel |
| 2014/0303970 A1 | 10/2014 | Bell |

FOREIGN PATENT DOCUMENTS

| CN | 105009203 A | 10/2015 |
| JP | 2009210829 A | 9/2009 |

OTHER PUBLICATIONS

"First Office Action and Search Report Issued in Chinese Patent Application No. 201780032505.8", dated Aug. 8, 2022, 19 Pages.
Wu, et al., "Rules Based Feature Modification for Affective Speaker Recognition", In Proceedings of IEEE International Conference on Acoustics Speech and Signal Processing Proceedings, May 14, 2006, pp. 661-664.
Xinshe, Ren, "Speech Keyword Extraction Based on Improved Eigenvalues", In Chinese Excellent Ph. D. and Master's Degree Theory, Science and Technology, Issue 3, Mar. 15, 2013, 64 Pages.

* cited by examiner

```
function [Block] = C00004
Block.No =3; % number of processing blocks          320
Block.Fs = 8000; % Sample Frequency
Block.FinalLevelType =2;  % Different options of measuring the final signal level (for
normalization): mean RMS (1) or dB headroom from peak (2)
Block.FinalLevel =-7;    % final level of the mixed signal      330
Block.Ir = 'RIR1863.wav'; % C50= 1.349 dB
Block.Level = 60;  % level of the clean speech signal (dB SPL)
Block.Dist = 1;    % simulated distance between microphone and speaker % Acoustic Channel Block
Block(1).Param.Type = 'ACH';                                              334
Block(1).Param.Dist = 1;    % distance to mic (m) from noise source
Block(1).Param.Air = '';    % optional room impulse response for the noise channel
Block(1).Param.Noise = 'restaurant2.wav'; % noise source file          332
Block(1).Param.Lev = 38.5;   % level of noise
Block(1).Param.Nc = 1000;    % noise cross fade duration in ms       324
Block(1).Param.Delay =2;    % start noise after x seconds
Block(1).Param.Rep = 1;     % repeat noise file if too short for the speech signal
Block(1).Param.RMS = 1;     % measure noise using RMS (1) or P.56 (0)

322
% Telephone Band Filter
Block(2).Param.Type = 'POTSBAND'; % apply Plain Old Telephone System Band-pass
filter %CODEC
Block(3).Param.Type = 'Codec';                       326
Block(3).Param.Codec = 'GSM-AMR'; % CODEC Type
Block(3).Param.Rate = '7.4';     % CODEC bit rate      328
Block(3).Param.Ber = 0;         % simulated channel errors (bit error rate)
Block(3).Param.Nloss = 0;        % simulated lost packets
```

306a

FIG. 3B

CHARACTERIZING, SELECTING AND ADAPTING AUDIO AND ACOUSTIC TRAINING DATA FOR AUTOMATIC SPEECH RECOGNITION SYSTEMS

RELATED APPLICATION

This application is the U.S. National Stage of International Application No. PCT/US2017/024343, filed Mar. 27, 2017, which designates the U.S., published in English, which is a continuation of U.S. application Ser. No. 15/082, 349, filed Mar. 28, 2016. The entire teachings of the above application(s) are incorporated herein by reference.

BACKGROUND

The scarcity of accurately transcribed, domain-specific training data is arguably the biggest obstacle to a more widespread and successful deployment of Automatic Speech Recognition (ASR) technology, while enormous amounts of highly varied, non-domain speech data are available on the Internet and in various speech databases.

As an example, suppose a Mobile Network Operator (MNO) in Italy intends to provide its customers a service that sends automatically created transcriptions of the voicemails the customer receives, in the form of text messages. In this example, the "domain" is the MNO voicemail environment, and the domain-specific training data include the actual voicemail messages received and stored by the MNO voicemail utility.

Data security legislation or internal rules, however, may prevent the MNO from retaining the voicemails it received beyond a few days, and from making the messages available for ASR training. Furthermore, privacy concerns may require that nobody but the recipient be allowed to listen to the messages, so that manually transcribing these messages is not feasible.

But large amounts of Italian speech data are available, for example from radio and TV shows, parliamentary debates, and selected contact center data, to name just a few. ASR models trained on this data, however, perform very poorly in a voicemail environment because of a strong mismatch between the speech characteristics between domain-specific data and non-domain data. There may also be a mismatch in terms of content (e.g., topics discussed and phrases used), but such mismatches are beyond the scope of this description.

It is well known that training the acoustic models of an ASR system with accurately labeled speech data, which is well matched to the Application Target Domain (ATD), is essential for high performance speech recognition. However, in many real-life applications, it is not possible to acquire labeled speech data for ASR training directly from the application—for example, when the application is new or when privacy or security concerns prohibit the use of the data and/or the manual labeling of the data.

SUMMARY OF THE INVENTION

Certain embodiments described herein include a system for and/or a method of determining relevant audio and acoustic characteristics of speech data from an Application Target Domain (ATD). The embodiments may use the determined target audio and acoustic characteristics to select speech data from available sources other than the ATD, referred to herein as Out-Of-Domain (OOD) speech data samples.

The described embodiments may select the speech data based on strength of similarities between the determined target audio and acoustic characteristics and the audio and acoustic characteristics of the OOD speech data from the available sources. The described embodiments may further adapt the selected OOD speech data by introducing modifications, based on the determined target audio and acoustic characteristics, to reduce further the mismatch between the target audio and acoustic characteristics and the audio and acoustic characteristics of the OOD speech data from the available sources.

Referring to the example set forth above, the described embodiments may analyze voicemails actually handled and processed by the MNO voicemail utility. The results of the analysis may be used to select speech data from the available OOD speech data having audio and acoustic characteristics that most closely match the audio and acoustic characteristics of the MNO voicemail data. Since the selected speech data is taken from OOD sources (i.e., sources other than the MNO voicemail network), much of the selected speech data would have been encoded by CODECs other than the CODECs used in the MNO network. Although, in general, the term CODEC refers to both the encoding and decoding of speech, the term CODEC as used herein may refer to only encoding, only decoding, or both encoding and decoding. Each CODEC imparts unique audio and acoustic characteristics to the encoded data, so the audio and acoustic characteristics of the selected speech data (encoded by one set of CODECs) will necessarily mismatch the speech characteristics of the MNO voicemail data (encoded by a different set of CODECs) to some extent. The described embodiments may identify the CODECs used to encode the MNO voicemail data and OOD speech data, and apply the characteristics of the identified CODECs used to encode the MNO voicemail data to appropriately selected OOD speech data.

The described embodiments may automatically determine an acoustic data profile (i.e., one or more acoustic properties) from a relatively small sample of speech data from the specific target domain. The sample may be automatically selected randomly, or according to a deterministic process, or both. Since no human intervention or labeling is required for such automatic determining, there are no privacy concerns when applied to an existing service. Once the data profile is determined, the described embodiments may select available labeled speech data that matches the determined data profile with a defined level of matching, and/or adapt available labeled OOD speech data samples to reduce the mismatch between the OOD speech data samples and the ATD speech data samples, whether the OOD speech data samples are adapted or selected and adapted.

In one aspect, an embodiment of the invention may be a system for determining audio and acoustic characteristics of an Application Target Domain (ATD). The system may include a processor and a memory with computer code instructions stored thereon. The memory is operatively coupled to the processor such that the computer code instructions cause the processor to analyze one or more speech data samples from the ATD to determine one or more target audio and acoustic characteristics. The target and acoustic characteristics may include one or more of CODEC type, bit-rate associated with the one or more speech data samples, sampling frequency associated with the speech data samples, active bandwidth associated with the speech data samples, noise level associated with the speech data samples, reverberation level associated with the speech data samples, clipping level associated with the speech data samples, and speaking rate associated with the speech data samples. The computer code instructions may further cause the processor to store in the memory, as a target data profile, the one or more target audio and acoustic characteristics.

In one embodiment, the computer code instructions may further cause the processor to use the target data profile to improve the accuracy of automatic speech recognition operating on the speech data samples from the ATD when OOD speech data samples from any domain other than the ATD is used to train or adapt the automatic speech recognition.

In another embodiment, the computer code instructions may further cause the processor to pre-process the speech data samples, prior to determining the one or more target audio and acoustic characteristics, to perform one or more of (i) selection of a target language associated with the speech data samples and (ii) remove any of the speech data samples that do not represent recognizable speech.

In another embodiment, the computer code instructions may further cause the processor to extract a feature set from the one or more speech data samples, and one or both of (i) reduce the feature dimension of the feature set with a Classification and Regression Tree (CART) based feature extraction analysis to produce a final feature set, or (ii) train a Deep Neural Network (DNN) classifier with the final feature set or a previously-determined feature set. The computer code instructions may further cause the processor to one or both of (i) apply the trained DNN to perform a CODEC type classification of one or more of the one or more speech data samples to produce a CODEC type associated with the one or more speech data samples, or (ii) apply the trained DNN to perform a bit-rate classification of one or more of the one or more speech data samples and bit-rate associated with the one or more speech data samples.

In one embodiment, the feature set includes one or more of Linear Prediction Coding (LPC) coefficients, line spectral frequencies, Mel-Frequency Cepstrum (MFC) coefficients, velocity features, acceleration features, Hilbert Transform-based features, statistics associated with one or more of the LPC coefficients, line spectral frequencies, MFC coefficients, velocity features, acceleration features, and Hilbert Transform-based features, and long-term spectral deviation from an Average Speech Spectrum (LTASS).

In another embodiment, the DNN classifier may include a plurality of nodes connected between an input layer and an output layer, each connection between the nodes being scaled by a coefficient, the nodes being modeled with a non-linear activation function.

In an embodiment, the computer code instructions may further cause the processor to analyze one or more OOD speech data samples to determine an OOD data profile associated with the OOD speech data samples, compare the target data profile to the OOD data profile.

Based on the comparing, computer code instructions may further cause the processor to select one or more of the OOD speech data samples as being similar to the speech data samples from the ATD. The OOD speech data samples being similar to the speech data samples from the ATD may require, for each audio and acoustic characteristic of the target and OOD data profiles, a difference between (i) a value of the audio and acoustic characteristic associated with the ATD speech data samples and (ii) a value of the audio and acoustic characteristic associated with the OOD speech data samples being within a predetermined range.

One embodiment may include a speech corruption toolkit configured to modify one or more OOD speech data samples based on the one or more audio and acoustic characteristics of the ATD speech data samples, in a manner that reduces a mismatch between the OOD speech data samples and the ATD speech data samples. The speech corruption toolkit may be configured to implement one or more of a speech channel simulator configured to modify the OOD speech samples based on one or both of the determined sampling frequency and the determined reverberation level, a noise channel simulator configured to modify the OOD speech samples based on the determined noise level, a microphone simulator configured to modify the OOD speech samples based on the determined active bandwidth, an amplifier simulator configured to modify the OOD speech samples based on the determined clipping level, and a transmission channel simulator configured to modify the OOD speech samples based on one or both of the determined CODEC type and bit-rate associated with the one or more speech data samples.

In one aspect, an embodiment of the invention may be a method of characterizing a target application acoustic domain. The method may be implemented by a processor operatively coupled to a memory, and comprise analyzing one or more speech data samples from the ATD to determine one or more target audio and acoustic characteristics. The target audio and acoustic characteristics may include one or more of CODEC type, bit-rate associated with the one or more speech data samples, sampling frequency associated with the speech data samples, active bandwidth associated with the speech data samples, noise level associated with the speech data samples, reverberation level associated with the speech data samples, clipping level associated with the speech data samples, and speaking rate associated with the speech data samples. The method may further comprise storing in the memory, as a target data profile, the one or more target audio and acoustic characteristics.

One embodiment may further comprise using the target data profile to improve the accuracy of automatic speech recognition operating on the speech data samples from the ATD when OOD speech data samples from any domain other than the ATD is used to train or adapt the automatic speech recognition.

One embodiment may further comprise pre-processing the speech data samples, prior to determining the one or more target audio and acoustic characteristics, to determine one or more of (i) selection of a target language associated with the speech data samples and (ii) removing any of the speech data samples that do not represent recognizable speech.

In one embodiment, analyzing the one or more speech data samples from the target application to determine a CODEC type and bit-rate associated with the speech data samples further includes extracting a feature set from the one or more speech data samples, and one or both of (i) reducing the feature dimension of the feature set with a Classification and Regression Tree (CART) based feature extraction analysis to produce a final feature set, or (ii) training a Deep Neural Network (DNN) classifier with the final feature set or a previously-determined feature set. Analyzing the one or more speech data samples from the target application to determine a CODEC type and bit-rate associated with the speech data samples may further include one or both of (i) applying the trained DNN to perform a CODEC type classification of one or more of the one or more speech data samples to produce a CODEC type associated with the one or more speech data samples, or applying the trained DNN to perform a bit-rate classification of one or more of the one or more speech data samples and bit-rate associated with the one or more speech data samples.

In one embodiment, the method may further include analyzing one or more OOD speech data samples to determine an OOD data profile associated with the OOD speech data samples, comparing the target data profile to the OOD data profile, and based on the comparing, selecting one or more of the OOD speech data samples as being similar to the speech data samples from the ATD.

In one embodiment, the method may further include determining that one or more of the OOD speech data samples is similar to the speech data samples from the ATD by determining, for each audio and acoustic characteristic of the target and OOD data profiles, a difference between a value of the audio and acoustic characteristic associated with the ATD speech data samples and a value of the audio and acoustic characteristic associated with the OOD speech data samples. The method may further include determining that the differences is within a predetermined range.

Another embodiment may further include modifying one or more OOD speech samples based on the one or more target acoustic characteristics.

Another embodiment may include one or more of modifying the OOD speech samples based on the determined sampling frequency, modifying the OOD speech samples based on the determined reverberation level, modifying the OOD speech samples based on the determined noise level, modifying the OOD speech samples based on the determined active bandwidth, modifying the OOD speech samples based on the determined clipping level, modifying the OOD speech samples based on the determined CODEC type, and modifying the OOD speech samples based on the determined bit-rate associated with the one or more speech data samples.

In one aspect, an embodiment of the invention may be a non-transitory computer-readable medium with computer code instruction stored thereon, the computer code instructions, when executed by an a processor, cause an apparatus to perform any of the methods described herein, all of the methods described herein, or any combination of the methods described herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
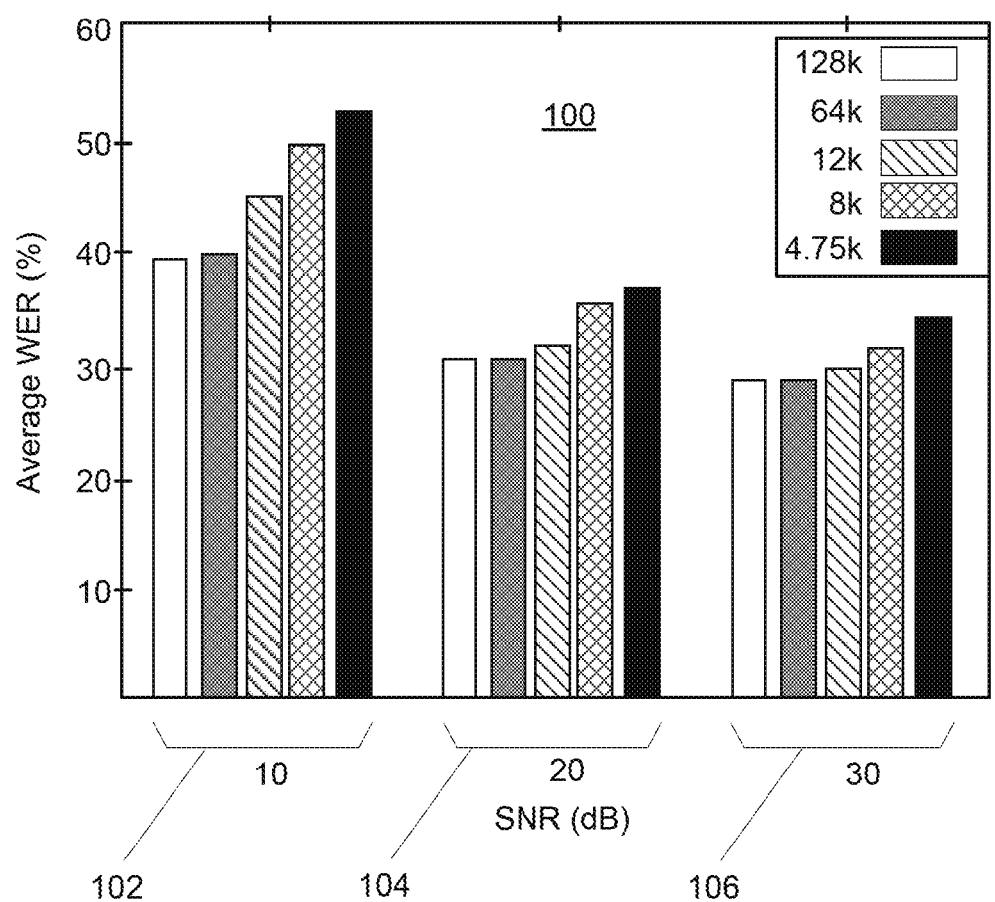
FIG. 1 shows an example of dependency between ASR performance and CODEC bit-rate.

A description of example embodiments of the invention follows.

The teachings of all patents, published applications and references cited herein are incorporated by reference in their entirety.

As described herein, speech data samples from applications other than the target application is known as Out-Of-Domain (OOD) data and is in general different in nature and characteristics from data associated with the Application Target Domain (ATD).

The described embodiments may include one or more of (1) determining target audio and acoustic characteristics of speech data associated with an ATD, (2) selection of OOD speech data based on the target audio and acoustic characteristics, and (3) adaptation of selected OOD speech data based on the target audio and acoustic characteristics. Selection of OOD speech data is referred to herein as "smart sampling." Adaptation of selected OOD speech data is referred to herein as "degradation synthesis."

Determining Audio and Acoustic Characteristics of Speech Associated with a Target Domain Application As described herein, a "target application" refers to an entity for which Automatic Speech Recognition (ASR) processing is to be applied. The "domain" defines the attributes of the application generally and including specifically the nature and characteristics of data associated with the application. In the example above, the MNO voicemail utility is the target application. The speech messages associated with the target application may be characterized by a data profile representing one or more audio and acoustic properties. The audio and acoustic properties are also referred to as speech characteristics.

The data profile for a particular target application may be derived from an analysis of representative speech data, i.e., speech data samples directly associated with the target application. Being "directly associated" with the target application as used herein means that the speech data samples are either (i) intended to be processed or otherwise utilized by the target application, (ii) have been utilized or otherwise processed by the target application, or both. In the above example, the speech data within messages stored by the MNO voicemail system would be the representative speech data. An analysis of the speech messages may determine a distribution of certain audio and acoustic characteristics, including but not limited to:

Sampling frequency
Active bandwidth
Noise levels
CODEC
Bit-rate
Reverberation level
Amount of clipping
Speaking rate SAMPLING FREQUENCY—The sampling frequency refers to the rate at which the underlying signal was sampled to produce the speech data of the target application. In some embodiments, the sampling frequency is characterized using broad categories such as "narrow," "wide," and super-wide," for example. In other embodiments, the sampling frequency is characterized using specific frequencies. A specific sampling frequency may be used as an acoustic property.

ACTIVE BANDWIDTH—The active bandwidth refers to the amount of frequency spectrum occupied by the speech data audio content. The active bandwidth may be limited, high end, low end, or both, by aspects of transport channels, such as the communications network associated with the ATD, and/or by the ATD itself. Some embodiments may categorize the active bandwidth by specifying upper and lower frequency boundaries. Other embodiments may categorize active bandwidth by specifying filtering effects (e.g., by identifying a detected POTSBAND filter—i.e., defining a standard 300-3400 Hz telephone bandwidth). It may also be characterized by a specific filter shape as obtained by recoding the signal with a microphone that has a corresponding specific response.

NOISE LEVELS—Noise levels refer to the amount of non-signal background noise detected in the speech message audio content, with respect to the speech audio itself. Noise levels are typically specified by signal to noise ratio (SNR), although other ways of specifying noise known in the art may also be used.

CODEC TYPE AND BIT RATE—These properties refer to the type of CODEC (encoder and/or decoder) device that was applied to the speech data audio content, and to the rate (e.g., kilobits per second; kb/s) at which the CODEC produces encoded speech data. For example, one type of CODEC known in the art is the Adaptive Multi-Rate (AMR) CODEC, which produces encoded data a several bit-rates (i.e., 12.2 10.2, 7.95 7.4, 6.7, 5.9, 5.15, and 4.75 kbits/s). The CODEC type and bit-rate provides information about the specific source coding algorithms used to encode the speech data.

REVERBERATION LEVELS—This acoustic property relates to persistence of sound after an initial reception of the sound. The persistence is due to multipath propagation, and reflection from surfaces, of sound in an enclosed acoustic space such as a room. One measure of reverberation level known in the art is C50, used by some of the described embodiments, is a ratio of early to late arriving sound, where the early arriving sound is sound that arrives from an initial time to 50 ms after the initial time, and the late arriving sound is sound that arrives more than 50 ms after the initial time. Other embodiments may use alternative measures of reverberation level known in the art.

AMOUNT OF CLIPPING—This acoustic property relates to distortion of the speech data acoustic waveform that may occur when an amplifier or other component processing the acoustic waveform is overdriven and cannot accommodate the full dynamic range of the waveform. The amplifier or other component essentially stops at its maximum output capability, thereby "clipping" or flattening the extreme portions of the acoustic waveform. The amount of clipping is typically specified in terms of a percentage.

SPEAKING RATE—this acoustic property relates to how fast the talker is speaking and is measured as the rate at which phonemes are being uttered (e.g., phonemes/s).

Non-intrusive techniques, meaning techniques using only the observed data without use of a reference signal, are well known in the literature for determining the speech properties including the noise level, reverberation level and bandwidth. However, this is not true for two of the most important properties: the CODEC type and bit-rate.

ASR performance is strongly dependent on the type and bit-rate of the CODEC used to transmit or store the audio signal prior to the recognition processing. An example of such dependency 100 is shown in FIG. 1, which plots the word error rate (WER) as a percentage for five different CODEC bit-rates at three noise levels. CODEC-dependence for three different input SNR values 102, 104, 106 is shown where 30 dB 106 indicates low noise levels and 10 dB 102 indicates high noise levels. CODEC properties are known to significantly affect the quality of speech signals and speech recognition performance. One or more of the described embodiments determine, based on an analysis of a speech signal, the type and bit-rate of the CODEC used to produce the speech signal.

The described embodiments determine the type and bit-rate of the CODEC by segmenting the target speech data into 20 ms non-overlapping frames, and extracting a feature vector having 82 dimensions per frame. This feature vector includes $10^{th}$ order LPC (Linear Predictive Coding) coefficients mapped to their Line Spectral Frequencies (LSF) representation, and $12^{th}$ order MFC (Mel-Frequency Cepstrum) coefficients, along with the velocity and acceleration features, computed using the Fast Fourier Transform (FFT), Long-Term Average Speech Spectrum (LTASS) and Hilbert Transform based features.

The per-frame features are further characterized by their statistics, including mean, variance, skewness and kurtosis, evaluated over an appropriate set of frames or over all frames in an utterance of speech, resulting in 328 global features. Additionally, 16 features characterizing the long-term spectral deviation are calculated, resulting in 344 global features. A Classification and Regression Tree (CART) based feature extraction is used to reduce the feature dimension (and, correspondingly, the computational complexity and real-time factor) by discarding features with low importance and high computational complexity.

Figure 2:
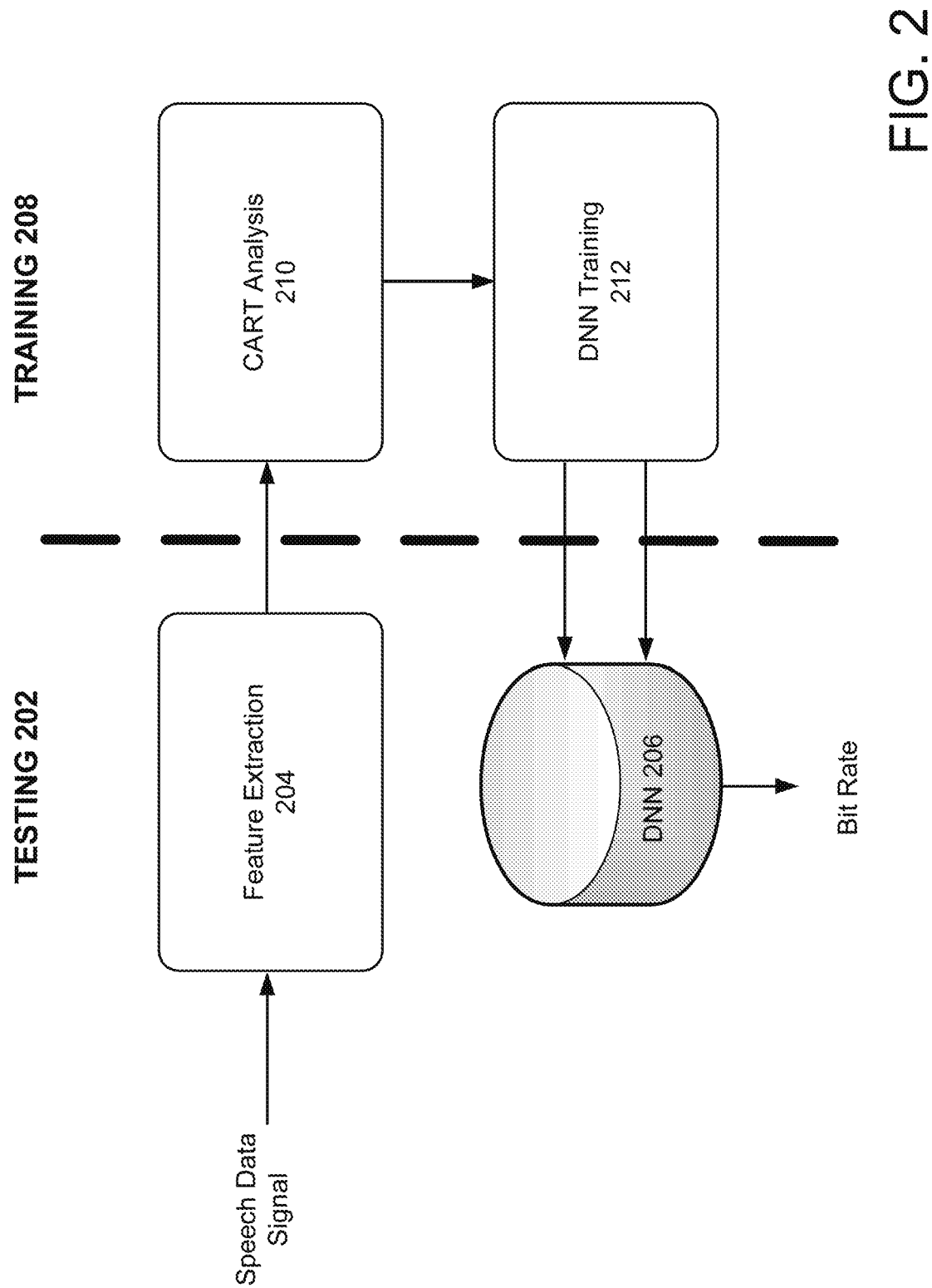
FIG. 2 shows an overview of CODEC type and bit-rate determination according to the described embodiments of the invention.

The final feature set is used to train a Deep Neural Network (DNN) classifier. The CART reduces the feature dimension in a systematic manner, as a pre-processor to the DNN training. An overview of the CODEC type and bit-rate determination is shown in FIG. 2. The left side of FIG. 2 shows a testing phase 202, where the feature extraction 204 is followed by evaluating the DNN 206. In the training phase 208, the CART analysis 210 is carried out to identify feature importance and along with feature complexity, a pruning decision is made and is followed by DNN training 212.

The Power spectrum of Long term Deviation (PLD) flatness and Hilbert envelope features were found to be useful for the bit-rate detection tasks. The Hilbert decomposition of a signal results in a rapidly varying fine structure component and a slowly varying envelope, which has been shown to be a useful factor in speech recognition. The described embodiments may determine the envelope for each frame of the decoded speech data, along with the variance and dynamic range of the envelope.

The DNN is a feed-forward artificial neural network with a number of non-linear hidden units (also referred to herein as nodes) connected between an input and output layer. The nodes in each layer are connected with nodes in adjacent layers, and each connection is scaled by a coefficient. The nodes are modeled with a non-linear activation function. An example embodiment uses a sigmoid function, although other non-linear activation functions may be used. A strong advantage of DNNs is that they can be discriminatively trained by back-propagating the derivatives of a cost function that measures the difference between the desired and estimated output, and adjusting the weights of the network in a fine-tuning stage using, for example, the L-BFGS optimization algorithm.

The Non-Intrusive Speaking Rate Estimation (NISE) begins by computing the $12^{th}$ order MFC coefficients of a speech data signal that has been windowed into 20 ms frames, with a 50% overlap. The delta MFC coefficients are then computed, and their squared sum is calculated per time-frame. A peak picking technique is then applied to detect peaks in this output, and the small peaks are then pruned according to a predetermined threshold. The number of peaks per second is then calculated and smoothed with a median filter. A Voice Activity Detector (VAD) is used to remove any long pauses in the signal. The average of the peak frequency vector thus gives an estimate of the phone speaking rate for the speech data.

Figure 3:
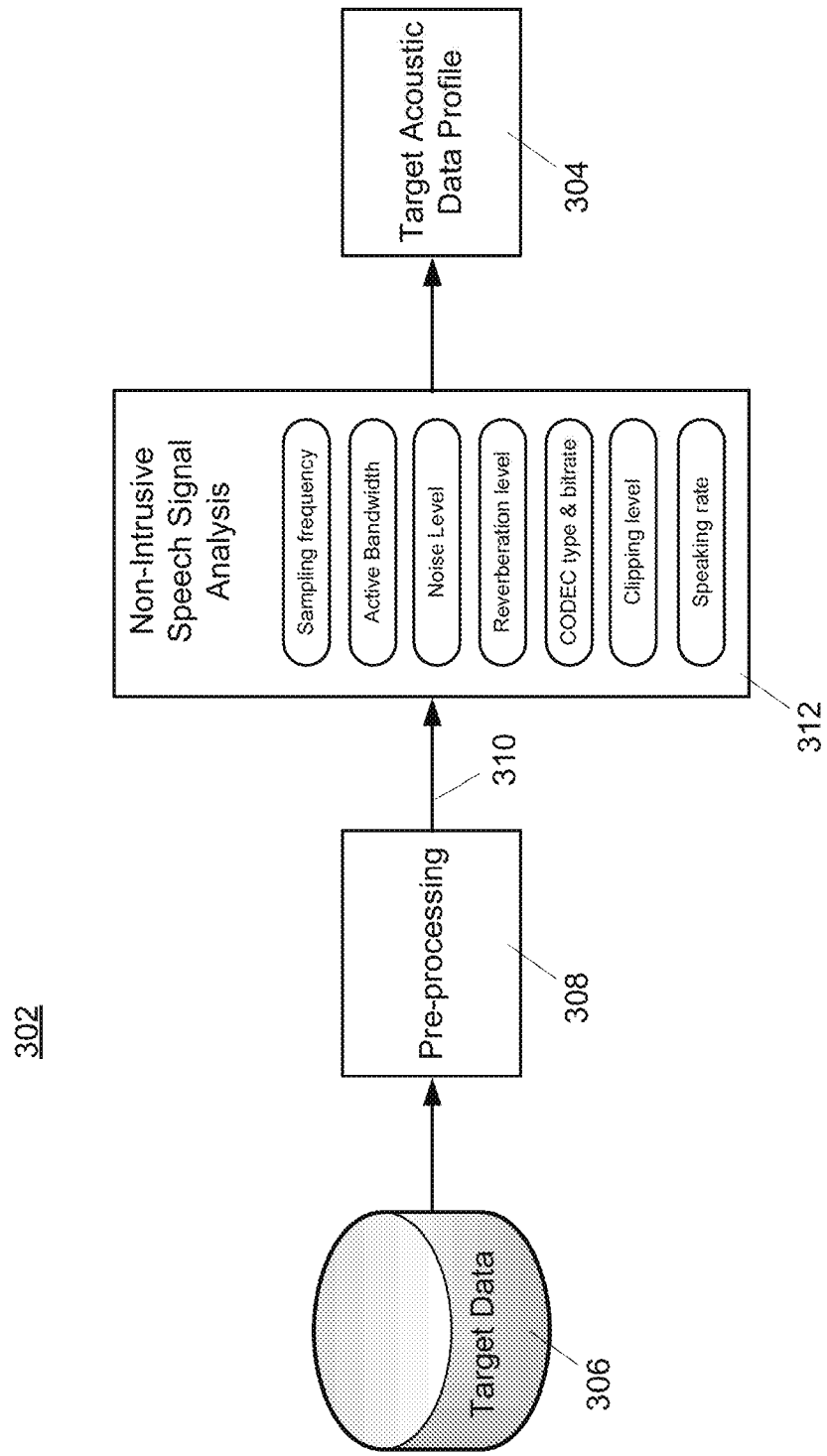
FIG. 3A shows example embodiment of a system for and method of determining a target acoustic data profile from a target speech data set.
FIG. 3B shows an example configuration file for applying certain degradations to OOD data.

FIG. 3A illustrates an example embodiment 302 of a system for and method of determining a target acoustic data profile 304 from a target speech data set 306. Pre-processing 308, which may include tasks such as removing any empty messages and selection of the target language, is performed by a pre-processor. The pre-processed data 310 is received by a non-intrusive speech signal analyzer for non-intrusive speech signal analysis 312, which may include one or more of sampling frequency analysis, active bandwidth analysis, noise level analysis, reverberation analysis, CODEC type and bit-rate analysis, clipping level analysis and speaking rate analysis, as described herein. Based on these analyses, the speech signal analyzer produces the target acoustic data profile 304.

FIG. 3B illustrates an example target speech data set 306a, which specifies a sampling frequency 320 of 8000 Hz, an active bandwidth 322 defined by a POTSBAND filter, noise levels 324 of 38.5 dB SPL, a CODEC type 326 of GSM/AMR and a CODEC bit-rate 328 of 7.4 kbits/s, and a reverberation level 330 specified by a C50 value of 1.349 dB. The example of FIG. 3B does not specify amount of clipping and speaking rate, demonstrating that a particular target speech data set may include any combination of the audio and acoustic characteristics described herein. Further, the example target speech data set 306a demonstrates that additional parameters, not specifically described herein, may be included in a particular target speech data set. For example, a noise source file 332 and a distance of the noise source to the microphone 334 may be included to further characterize the acoustic channel of the target application.

Selection and/or Adaptation of Training Data

The described embodiments consider three characteristic types of ASR training data. A first characteristic type of training data includes speech data in the form of clean 'laboratory' recordings. The laboratory recordings contain none of the degrading signal properties encountered in 'real-world' audio such as noise or reverberation or process by a CODEC. When starting with this first characteristic type of speech data the entire speech degradation mechanism must be synthesized.

In a second characteristic type of training data, the speech data is in the form of speech data samples from an application domain different from the target domain. Such speech data samples contain some of the speech signal properties but not usually in the distribution corresponding to the target domain. In this scenario, a combination of appropriate sub-selection of relevant speech data samples and degradation synthesis may be required.

In a third characteristic type of training data, the speech data is in the form of speech data samples from the target application domain. Such speech data samples contain representative distributions of the audio and acoustic characteristics, degradations and other properties. These are required to calculate the signal analytics to perform the degradation synthesis or sub-sampling.

Building an acoustic (or language) model in a speech recognition system with modified version of the available training data is known in the art as "training-set adaptation" and "selective training." These approaches may be preferred when the available training data is OOD, corresponding to the first and second characteristic types of data described above, or when the amount of in-domain data, corresponding to the third characteristic type of data above, is insufficient.

Training-set adaptation may then be performed by modifying, using appropriate signal processing methods, the first characteristic type of training data so that the distributions of speech characteristics in the training set after modification match the expected speech characteristic distributions of speech data associated with the target application.

Selective training may be performed by selecting from the second characteristic type of training data a subset of training examples such that the distributions of speech properties in the subset of the training set after selection match the expected distributions in the target application.

Figure 4:
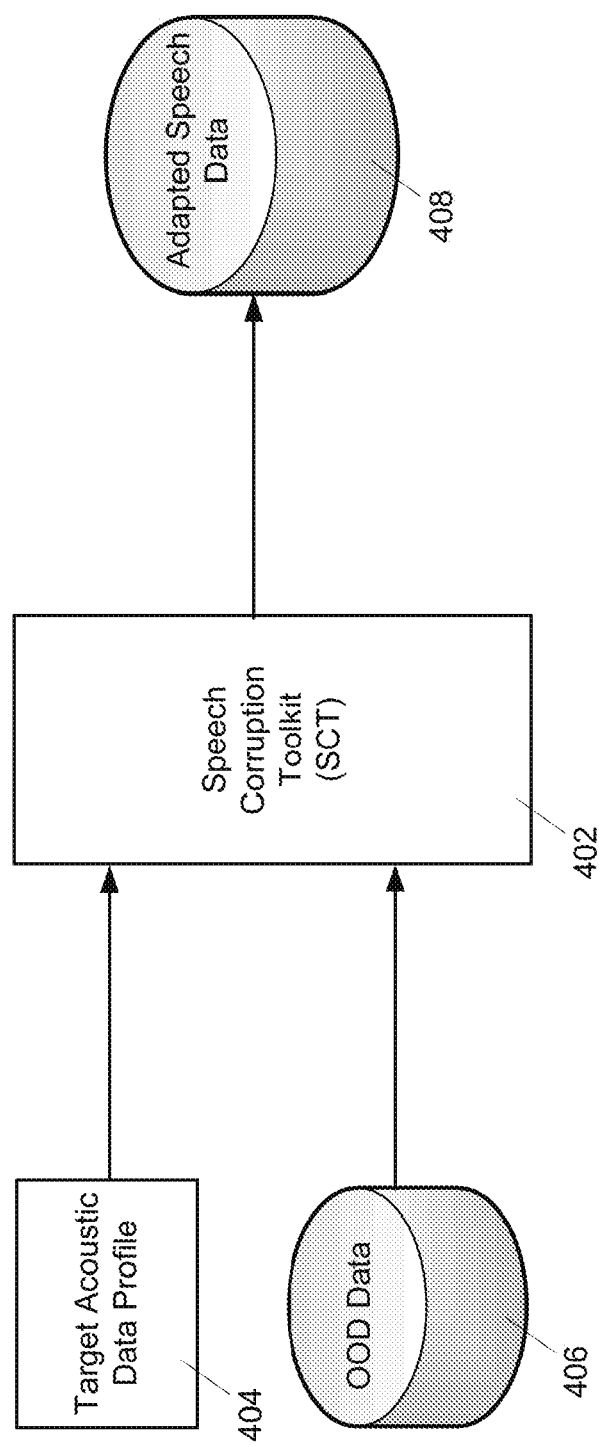
FIG. 4 shows an example speech corruption toolkit implementing degradation synthesis to out-of-domain speech data.

When beginning with 'clean laboratory' speech data, a speech corruption toolkit (SCT) may be used to apply the target audio and acoustic characteristics to the clean laboratory speech data. The SCT is an end-to-end simulation tool, with the capability of simulating the entire degradation chain, from the acoustic channel to the transcoded received signal for single channel audio. FIG. 4 shows an example SCT implementing degradation synthesis to OOD speech data.

Referring to FIG. 4, the SCT 402 receives two inputs: A target acoustic data profile 404, and OOD speech data 406. The SCT modifies the OOD speech data 406 based on the target acoustic data profile, to produce the adapted speech data 408.

Figure 5:
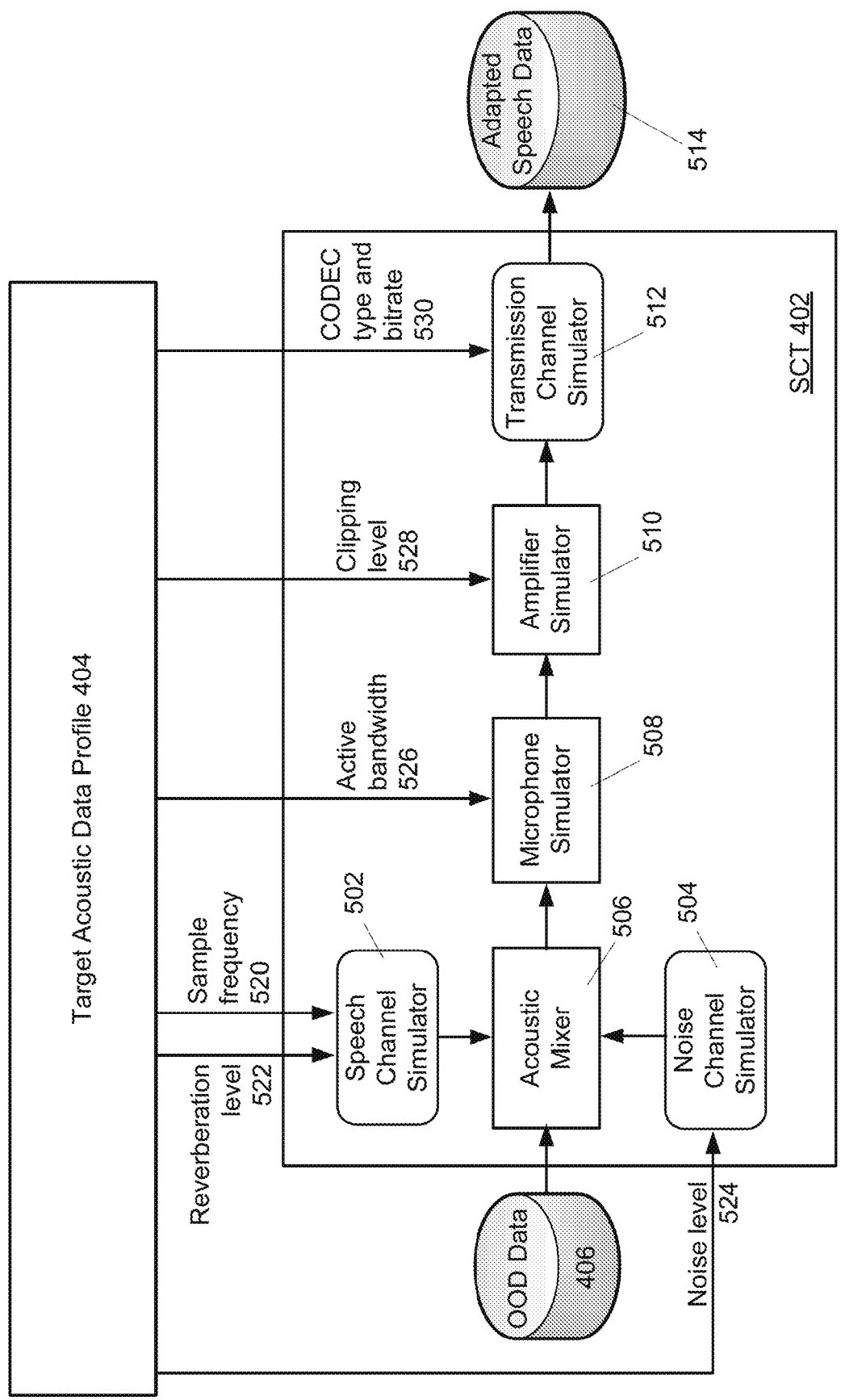
FIG. 5 shows a detailed view of the speech corruption toolkit depicted in FIG. 4.

FIG. 5 is a more detailed illustration of an example SCT. A speech channel simulator 502 combines the determined sample frequency 520 and reverberation level 522 into a form suitable for modifying the OOD speech data 406. A noise channel simulator 504 converts the determined noise level 524 into a form suitable for modifying the OOD speech data 406. An acoustic mixer 506 combines the speech channel simulator 502 output and the noise simulator 504 output with the OOD speech data 406, and provides the result to the microphone simulator 508. The microphone simulator 508 converts the determined active bandwidth 526 into a form suitable for modifying the OOD data, and modifies the output of the acoustic mixer 506 according to the determined active bandwidth 526. The amplifier simulator 510 modifies the output of the microphone simulator according to the determined clipping level 528, and the transmission channel simulator 512 modifies the output of the amplifier simulator 510 according to the determined CODEC type and bit-rate 530. The output of the transmission channel simulator 512 is stored as adapted speech data 514. The resulting adapted speech data 514 is therefore the OOD speech data modified by the sample frequency 520, reverberation level 522, noise level 524, active bandwidth 526, clipping level 528, and CODEC type and bit-rate 530, associated with the target application domain. This example embodiment shows one order of the OOD speech data modification. Other embodiments may implement different sequential orders of processing. Further, other embodiments may combine or separate the processing blocks shown.

Figure 6:
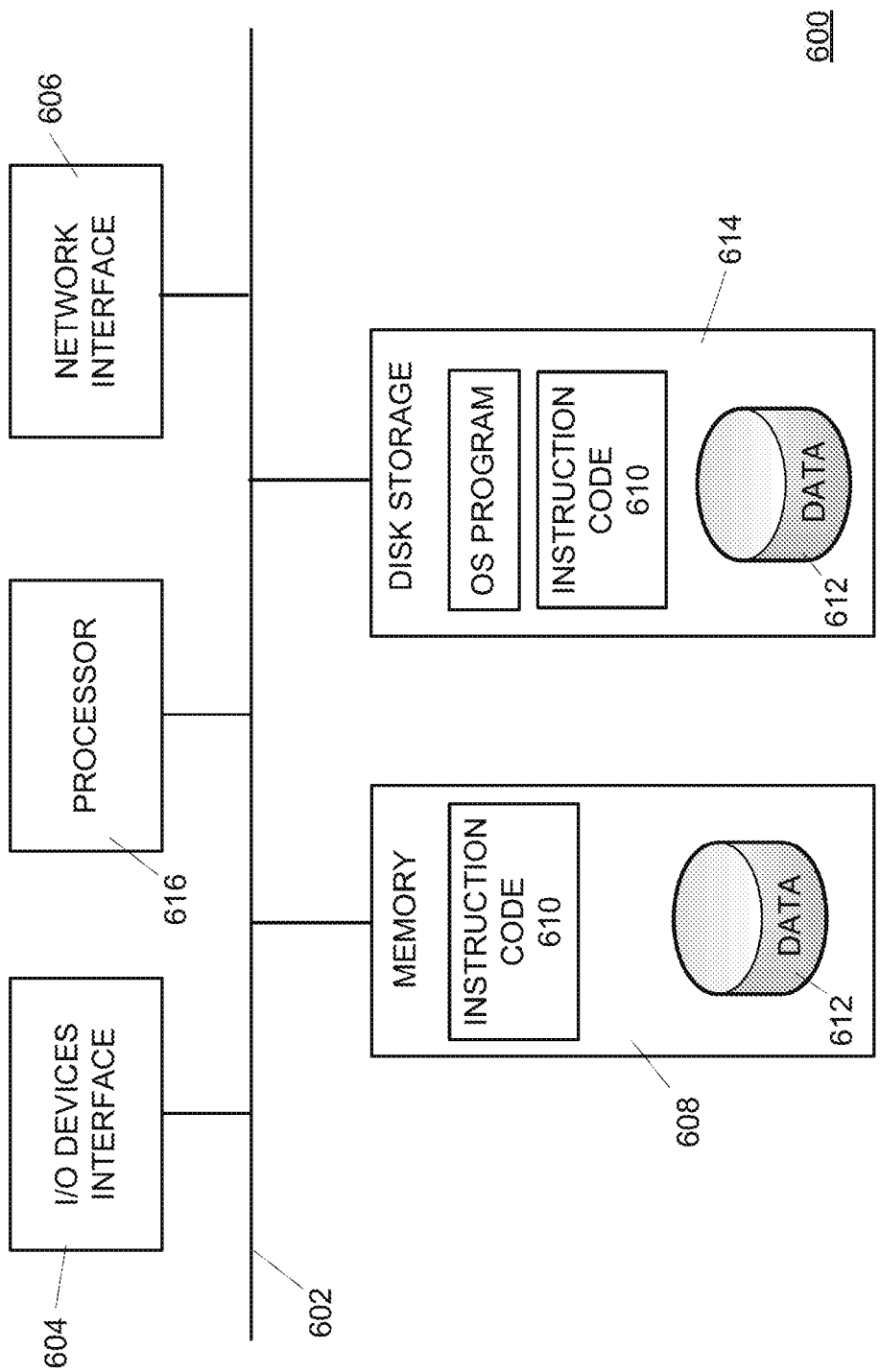
FIG. 6 shows an example computer for implementing one or more of the described embodiments.

FIG. 6 is a diagram of an example internal structure of a computer 600 that may be used to implement portions of the described embodiments. The computer 600 includes a system bus 602, where a bus is a set of hardware lines used for data transfer among the components of a computer or processing system. The system bus 602 is essentially a shared conduit that connects different elements of a computer system (e.g., processor, disk storage, memory, input/output ports, network ports, etc.) that enables the transfer of information between the elements. Attached to the system bus 602 is an I/O device interface 604 for connecting various input and output devices (e.g., keyboard, mouse, displays, printers, speakers, etc.) to the computer 600. A network interface 606 allows the computer to connect to various other devices attached to a network. Memory 608 provides volatile storage for computer software instruction code 610 and data 612 used to implement one or more of the described embodiments. Disk storage 614 provides non-volatile storage for computer software instructions 610 and data 612 used to implement an embodiment of the present invention. A central processor unit 616 is also attached to the system bus 602 and provides for the execution of computer instructions.

In one embodiment, the processor instructions 610 and data 612 are a computer program product, including a non-transitory computer-readable medium (e.g., a removable storage medium such as one or more DVD-ROM's, CD-ROM's, diskettes, tapes, etc.) that provides at least a portion of the instruction code for the described embodiments. The computer program product can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions 610 for the described embodiments.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

Figure 7:
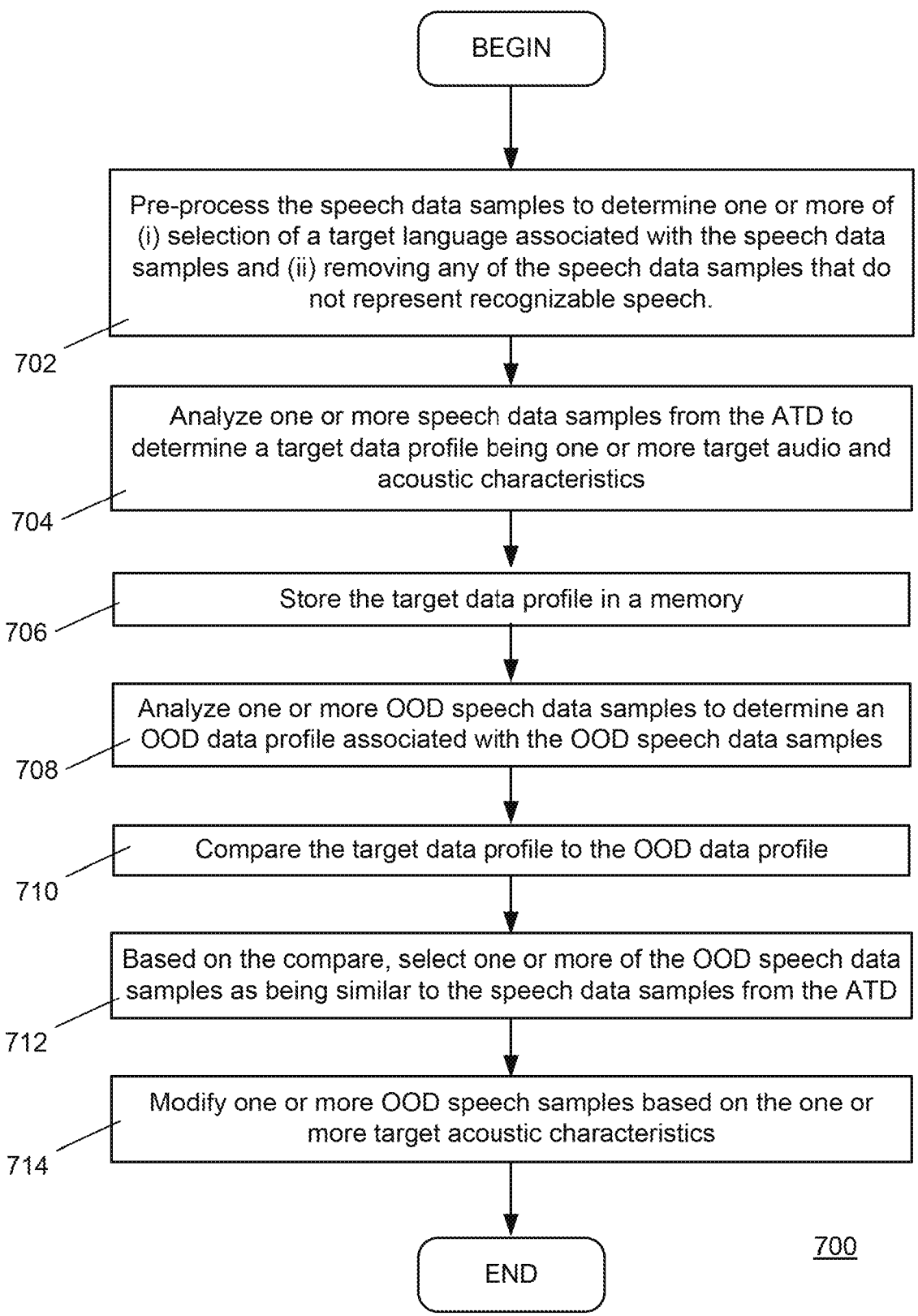
FIG. 7 illustrates one example of a method according to the described embodiments.

FIG. 7 illustrates one example of a method 700 according to the described embodiments. The method 700 may include pre-processing 702 the speech data samples to determine one or more of (i) selection of a target language associated with the speech data samples and (ii) removing any of the speech data samples that do not represent recognizable speech. The method 700 may further include analyzing 704 one or more speech data samples from the ATD to determine a target data profile being one or more target audio and acoustic characteristics, and storing 706 the target data profile in a memory. The method 700 may also include analyzing 708 one or more OOD speech data samples to determine an OOD data profile associated with the OOD speech data samples, comparing 710 the target data profile to the OOD data profile, and selecting 712, based on the comparing 710, one or more of the OOD speech data samples as being similar to the speech data samples from the ATD. The method 700 may further include modifying 714 one or more OOD speech samples based on the one or more target acoustic characteristics. Embodiments according to the invention may include one or more, or all of the above-described steps, or may include some or all of these steps combined with other steps as described herein, or may include alternative steps described herein but not set forth in the example method above.

Embodiments or aspects of the present invention may be implemented in the form of hardware, software, or firmware. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:
1. A system for determining audio and acoustic characteristics of an Application Target Domain (ATD), comprising:
   a processor; and
   a memory with computer code instructions stored thereon, the memory operatively coupled to the processor such that the computer code instructions cause the processor to:
   analyze one or more speech data samples from the ATD to determine one or more target audio and acoustic characteristics, including one or more of:
      (a) CODEC type;
      (b) bit-rate associated with the one or more speech data samples;
      (c) sampling frequency associated with the speech data samples;
      (d) active bandwidth associated with the speech data samples;
      (e) noise level associated with the speech data samples;

(f) reverberation level associated with the speech data samples;
(g) clipping level associated with the speech data samples;
(f) speaking rate associated with the speech data samples; and
select, from an out-of-domain (OOD) speech set, one or more speech samples that match a target data profile, speech from the OOD speech set being different from speech from the ATD; and
train a Deep Neural Network (DNN) with the one or more speech samples selected from the OOD speech set.

2. The system of claim 1, wherein the computer code instructions further cause the processor to use the target data profile to improve the accuracy of automatic speech recognition operating on the speech data samples from the ATD when OOD speech data samples from any domain other than the ATD is used to train or adapt the automatic speech recognition.

3. The system of claim 1, wherein the computer code instructions further cause the processor to pre-process the speech data samples, prior to determining the one or more target audio and acoustic characteristics, to perform one or more of (i) selection of a target language associated with the speech data samples and (ii) remove any of the speech data samples that do not represent recognizable speech.

4. The system of claim 1, wherein for the analysis of the one or more speech data samples from the target application to determine a CODEC type and bit-rate associated with the speech data samples, the computer code instructions further cause the processor to:
extract a feature set from the one or more speech data samples;
one or both of:
reduce the feature dimension of the feature set with a Classification and Regression Tree (CART) based feature extraction analysis to produce a final feature set; or
train a Deep Neural Network (DNN) classifier with the final feature set or a previously-determined feature set; and
one or both of:
apply the trained DNN to perform a CODEC type classification of one or more of the one or more speech data samples to produce a CODEC type associated with the one or more speech data samples; or
apply the trained DNN to perform a bit-rate classification of one or more of the one or more speech data samples and bit-rate associated with the one or more speech data samples.

5. The system of claim 4, wherein the feature set includes one or more of (i) Linear Prediction Coding (LPC) coefficients, (ii) line spectral frequencies, (iii) Mel-Frequency Cepstrum (MFC) coefficients, (iv) velocity features, (v) acceleration features, (vi) Hilbert Transform-based features, (vii) statistics associated with one or more of the LPC coefficients, line spectral frequencies, MFC coefficients, velocity features, acceleration features, and Hilbert Transform-based features, and (xi) long-term spectral deviation from an Average Speech Spectrum (LTASS).

6. The system of claim 4, wherein the DNN classifier includes a plurality of nodes connected between an input layer and an output layer, each connection between the nodes being scaled by a coefficient, the nodes being modeled with a non-linear activation function.

7. The system of claim 1, wherein the computer code instructions further cause the processor to:
analyze one or more OOD speech data samples to determine an OOD data profile associated with the OOD speech data samples;
compare the target data profile to the OOD data profile; and
based on the comparing, select one or more of the OOD speech data samples as being similar to the speech data samples from the ATD.

8. The system of claim 7, wherein the OOD speech data samples being similar to the speech data samples from the ATD requires, for each audio and acoustic characteristic of the target and OOD data profiles, a difference between (i) a value of the audio and acoustic characteristic associated with the ATD speech data samples and (ii) a value of the audio and acoustic characteristic associated with the OOD speech data samples being within a predetermined range.

9. The system of claim 1, further including a speech corruption toolkit configured to modify one or more OOD speech data samples based on the one or more audio and acoustic characteristics of the ATD speech data samples in a manner that reduces a mismatch between the OOD speech data samples and the ATD speech data samples, the speech corruption toolkit being configured to implement one or more of:
(i) a speech channel simulator configured to modify the OOD speech samples based on one or both of the determined sampling frequency and the determined reverberation level;
(ii) a noise channel simulator configured to modify the OOD speech samples based on the determined noise level;
(iii) a microphone simulator configured to modify the OOD speech samples based on the determined active bandwidth;
(iv) an amplifier simulator configured to modify the OOD speech samples based on the determined clipping level; and
(v) a transmission channel simulator configured to modify the OOD speech samples based on one or both of the determined CODEC type and bit-rate associated with the one or more speech data samples.

10. A method of characterizing a target application acoustic domain, comprising:
by a processor operatively coupled to a memory:
analyzing one or more speech data samples from the ATD to determine one or more target audio and acoustic characteristics, including one or more of:
(a) CODEC type;
(b) bit-rate associated with the one or more speech data samples;
(c) sampling frequency associated with the speech data samples;
(d) active bandwidth associated with the speech data samples;
(e) noise level associated with the speech data samples;
(f) reverberation level associated with the speech data samples;
(g) clipping level associated with the speech data samples;
(h) speaking rate associated with the speech data samples; and
selecting, from an out of domain (OOD) speech set, one or more speech samples that match a target data profile, speech from the OOD speech set being different from speech from the ATD; and training a Deep Neural Network (DNN) with the one or more speech samples selected from the OOD spech set.

11. The method of claim 10, further including using the target data profile to improve the accuracy of automatic speech recognition operating on the speech data samples from the ATD when OOD speech data samples from any domain other than the ATD is used to train or adapt the automatic speech recognition.

12. The method of claim 10, further including pre-processing the speech data samples, prior to determining the one or more target audio and acoustic characteristics, to determine one or more of (i) selection of a target language associated with the speech data samples and (ii) removing any of the speech data samples that do not represent recognizable speech.

13. The method of claim 10, wherein analyzing the one or more speech data samples from the target application to determine a CODEC type and bit-rate associated with the speech data samples further includes:

extracting a feature set from the one or more speech data samples;

one or both of:

reducing the feature dimension of the feature set with a Classification and Regression Tree (CART) based feature extraction analysis to produce a final feature set; or training a Deep Neural Network (DNN) classifier with the final feature set or a previously-determined feature set; and one or both of:

applying the trained DNN to perform a CODEC type classification of one or more of the one or more speech data samples to produce a CODEC type associated with the one or more speech data samples; or applying the trained DNN to perform a bit-rate classification of one or more of the one or more speech data samples and bit-rate associated with the one or more speech data samples.

14. The method of claim 10, further including:

analyzing one or more OOD speech data samples to determine an OOD data profile associated with the OOD speech data samples;

comparing the target data profile to the OOD data profile; and based on the comparing, selecting one or more of the OOD speech data samples as being similar to the speech data samples from the ATD.

15. The method of claim 14, further including determining that one or more of the OOD speech data samples is similar to the speech data samples from the ATD by:

determining, for each audio and acoustic characteristic of the target and OOD data profiles, a difference between (i) a value of the audio and acoustic characteristic associated with the ATD speech data samples and (ii) a value of the audio and acoustic characteristic associated with the OOD speech data samples; and determining that the differences is within a predetermined range.

16. The method of claim 10, further including modifying one or more OOD speech samples based on the one or more target acoustic characteristics.

17. The method of claim 16, further including one or more of:

(i) modifying the OOD speech samples based on the determined sampling frequency;

(ii) modifying the OOD speech samples based on the determined reverberation level;

(ii) modifying the OOD speech samples based on the determined noise level;

(iii) modifying the OOD speech samples based on the determined active bandwidth;

(iv) modifying the OOD speech samples based on the determined clipping level;

(v) modifying the OOD speech samples based on the determined CODEC type; and (vi) modifying the OOD speech samples based on the determined bit-rate associated with the one or more speech data samples.

18. A non-transitory computer-readable medium with computer code instruction stored thereon, the computer code instructions, when executed by an a processor, cause an apparatus to:

analyze one or more speech data samples from the ATD to determine one or more target audio and acoustic characteristics, including one or more of:

(a) CODEC type;

(b) bit-rate associated with the one or more speech data samples;

(c) sampling frequency associated with the speech data samples;

(d) active bandwidth associated with the speech data samples;

(e) noise level associated with the speech data samples;

(f) reverberation level associated with the speech data samples;

(g) clipping level associated with the speech data samples;

(h) speaking rate associated with the speech data samples; and select, from an out of domain (OOD) speech set, one or more speech samples that match a target data profile, speech from the OOD speech set being different from speech from the ATD; and train a Deep Neural Network (DNN) with the one or more speech samples selected from the OOD speech set.

19. The non-transitory computer-readable medium of claim 18, the computer instructions when executed by a processor further cause the apparatus to use the target data profile to improve the accuracy of automatic speech recognition operating on the speech data samples from the ATD when OOD speech data samples from any domain other than the ATD is used to train or adapt the automatic speech recognition.

20. The non-transitory computer-readable medium of claim 19, the computer instructions when executed by a processor further cause the apparatus to:

extract a feature set from the one or more speech data samples;

one or both of:

reduce the feature dimension of the feature set with a Classification and Regression Tree (CART) based feature extraction analysis to produce a final feature set; or train a Deep Neural Network (DNN) classifier with the final feature set or a previously-determined feature set;

one or both of:
- apply the trained DNN to perform a CODEC type classification of one or more of the one or more speech data samples to produce a CODEC type associated with the one or more speech data samples; or
- apply the trained DNN to perform a bit-rate classification of one or more of the one or more speech data samples and bit-rate associated with the one or more speech data samples.

* * * * *